RICHARD G. OSLEBO
ROBERT F. NEWTON
ALDEN H. JACOBSON
INVENTOR.

BY

Norman S. Blodgett

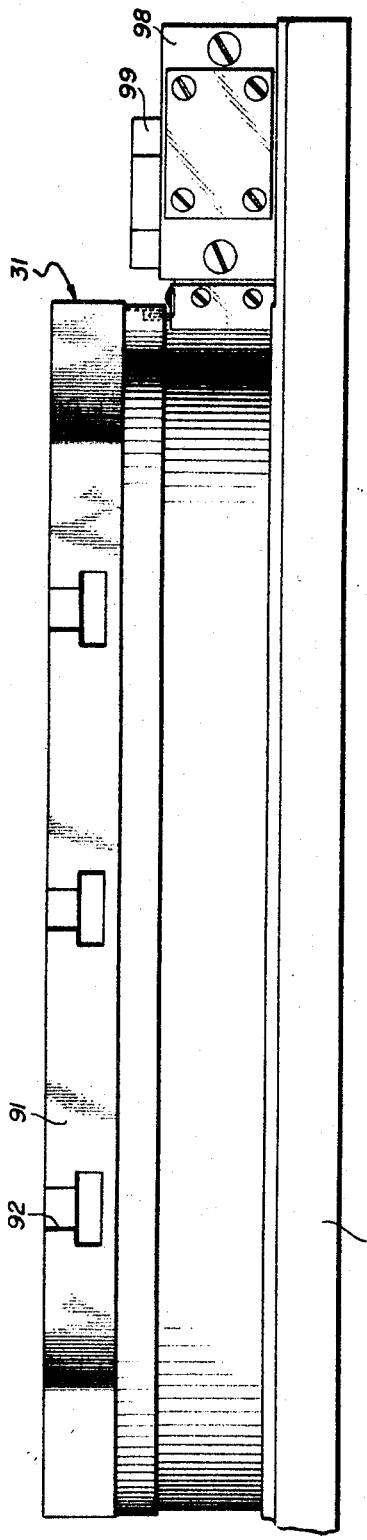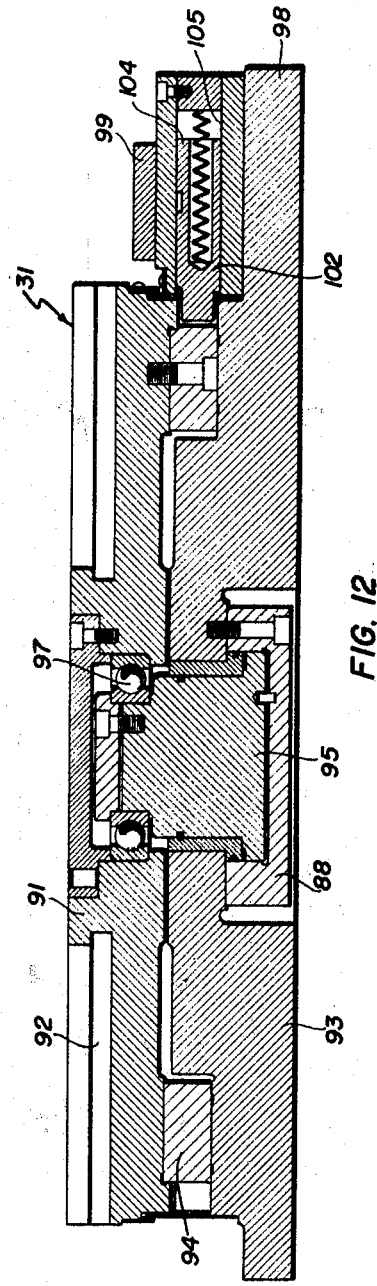

Aug. 5, 1969　　　R. G. OSLEBO ET AL　　　3,458,924
MACHINE TOOL
Filed Aug. 23, 1967　　　　　　　　　17 Sheets-Sheet 11
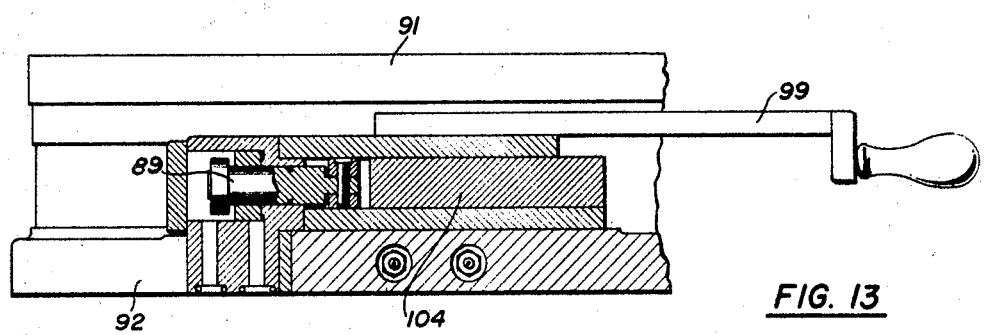
FIG. 13
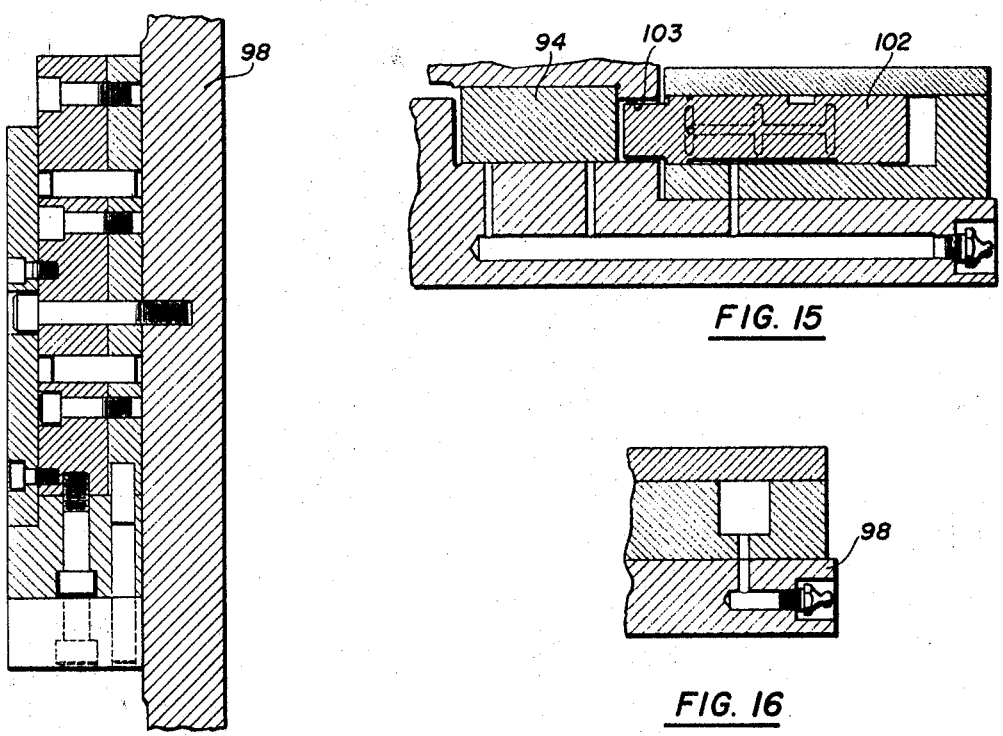
FIG. 14
FIG. 15
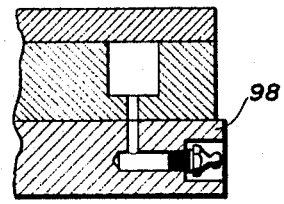
FIG. 16

United States Patent Office 3,458,924
Patented Aug. 5, 1969

3,458,924
MACHINE TOOL
Richard G. Oslebo, Holden, Robert F. Newton, Worcester, and Alden H. Jacobson, Princeton, Mass., assignors to The Heald Machine Company, Worcester, Mass., a corporation of Delaware
Filed Aug. 23, 1967, Ser. No. 662,745
Int. Cl. B23q 1/08, 3/157
U.S. Cl. 29—568                                    10 Claims

ABSTRACT OF THE DISCLOSURE

This invention relates to a machine tool and, more particularly, to apparatus for boring, drilling, and other operations with a plurality of cutting tools wherein means is provided for removing the tools one by one from a storage rack and introducing them to the work area.

Background of the invention

Figure 1:
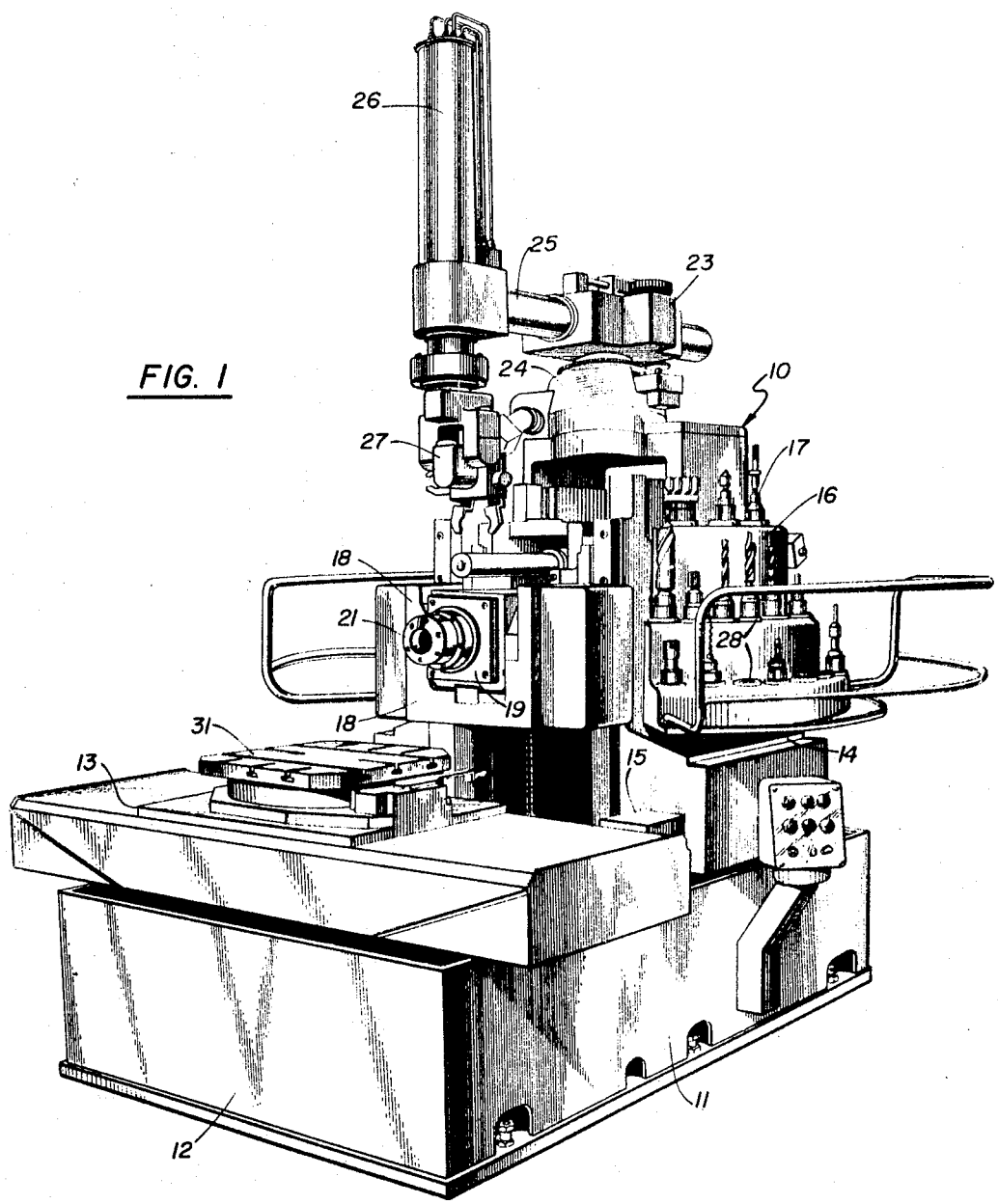

In the machining art, it has become common practice to use a universal-type of machine in which a large number of tools are stored in a rack adjacent the machine and in which means is provided for introducing the tools one by one into the work area. The selection of tool, of its rate of feed, and its depth of cut, among other variables, have often been controlled automatically from tapes, cards, and the like. The difficulty in the past has been that such machine tools have been extremely expensive and very complicated. Furthermore, they have occupied a large space and, in many cases, the number of tools that are available for use in the machine has been severely restricted. Among other things, machine tools embodying numerical control, tool storage, and tool changing have been very complex and, in general, lack the strength and ruggedness necessary for heavy machining operations. These and other difficulties experienced with the prior art devices have been obviated in a novel manner by the present invention.

Objects

It is, therefore, an outstanding object of the invention to provide a machine tool which is simple in construction, inexpensive to manufacture and yet extremely versatile in use.

Another object of this invention is the provision of a machine tool embodying tool changing apparatus wherein the tool storage means is incorporated into the body of the machine.

A further object of the present invention is the provision of a machine tool in which the work spindle is supported in such a way that change in temperature does not change the location of its axis.

It is another object of the instant invention to provide a machine tool incorporating tool changing and storage apparatus wherein the available space is used most effectively.

It is a further object of the invention to provide a machine tool embodying tool storage in which the tool storage and changing apparatus is an integral part of the machine tool, thus conserving space and leading to simplified work changing and machining operations.

A still further object of this invention is the provision of a machine tool incorporating a storage rack which permits the storage of a large number of tools close to the work area without interfering with machining operations.

It is a still further object of the present invention to provide a machine tool incorporating a tool changer which is simple in operation and capable of being constructed simply and ruggedly to give a long life of useful service with a minimum of breakdown or maintenance.

Another object of the invention is the provision of a machine tool in which the machining apparatus, tool storage, and tool changing equipment can be arranged in a rugged conformation permitting heavy machining operations without deflection of machine parts to perform accurate machining under automatic control.

With these and other objects in view, as will be apparent to those skilled in the art, the invention resides in the combination of parts set forth in the specification and covered by the claims appended hereto.

Description of the invention

Figure 2:
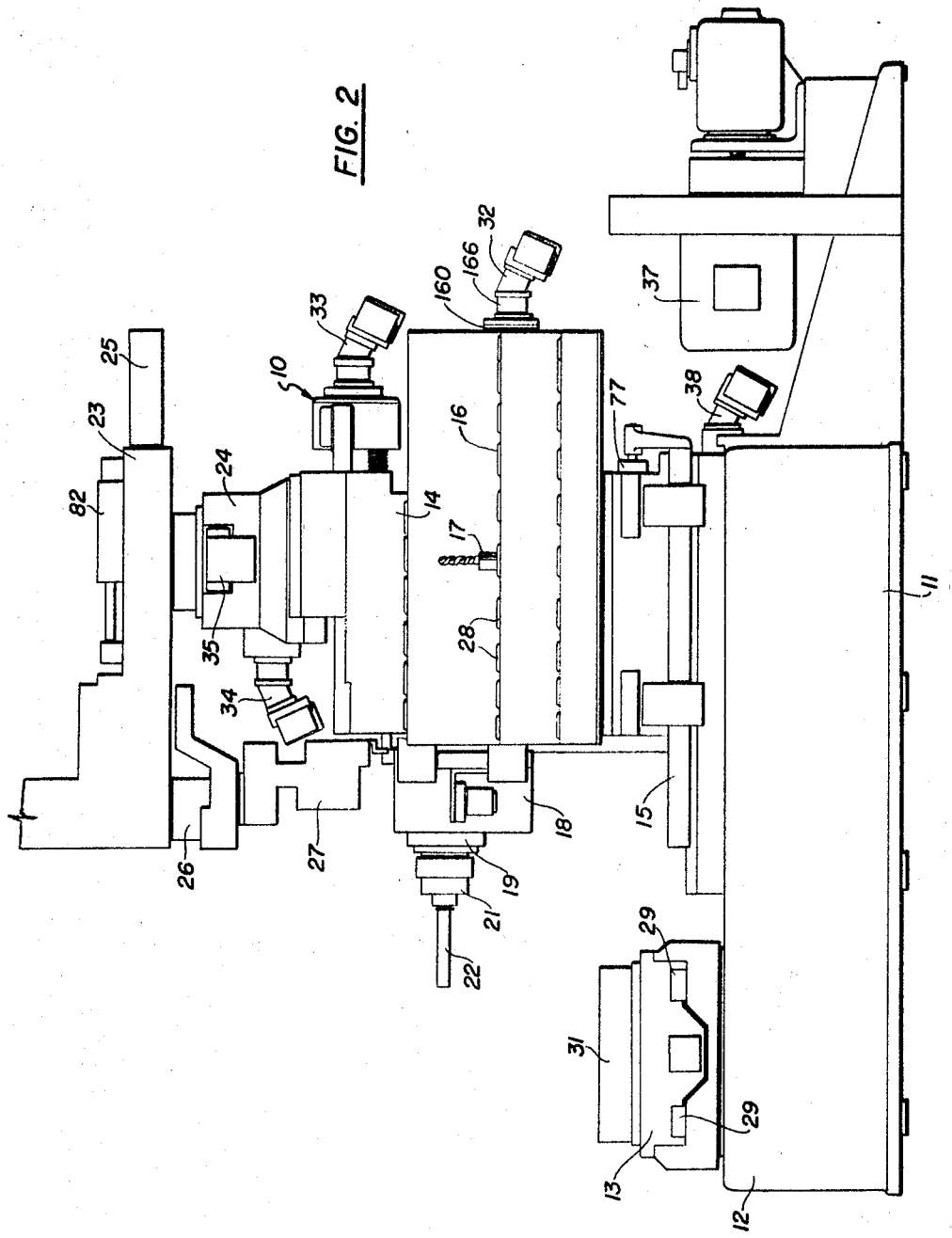
Figure 3:
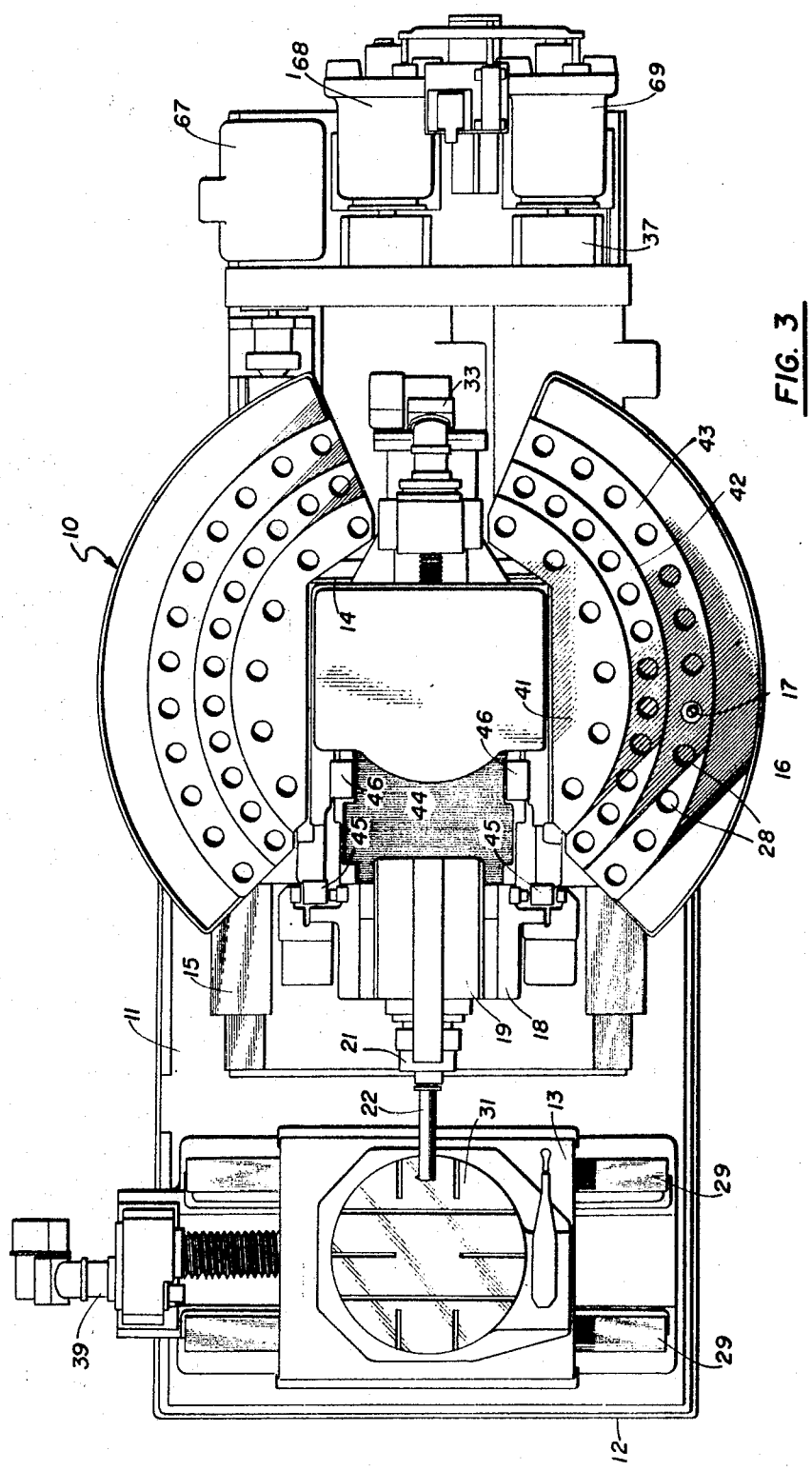
Figure 4:
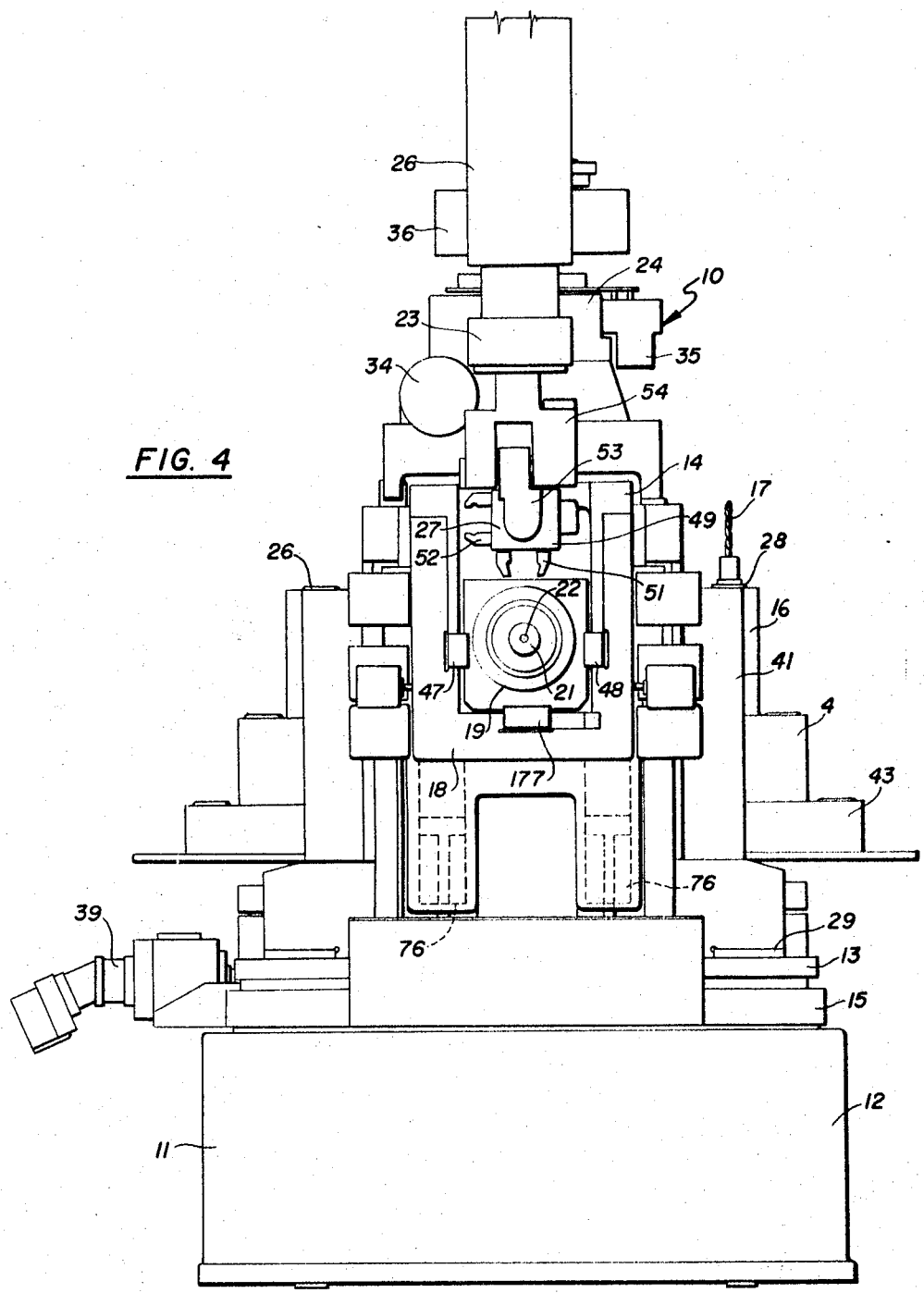
Figure 5:
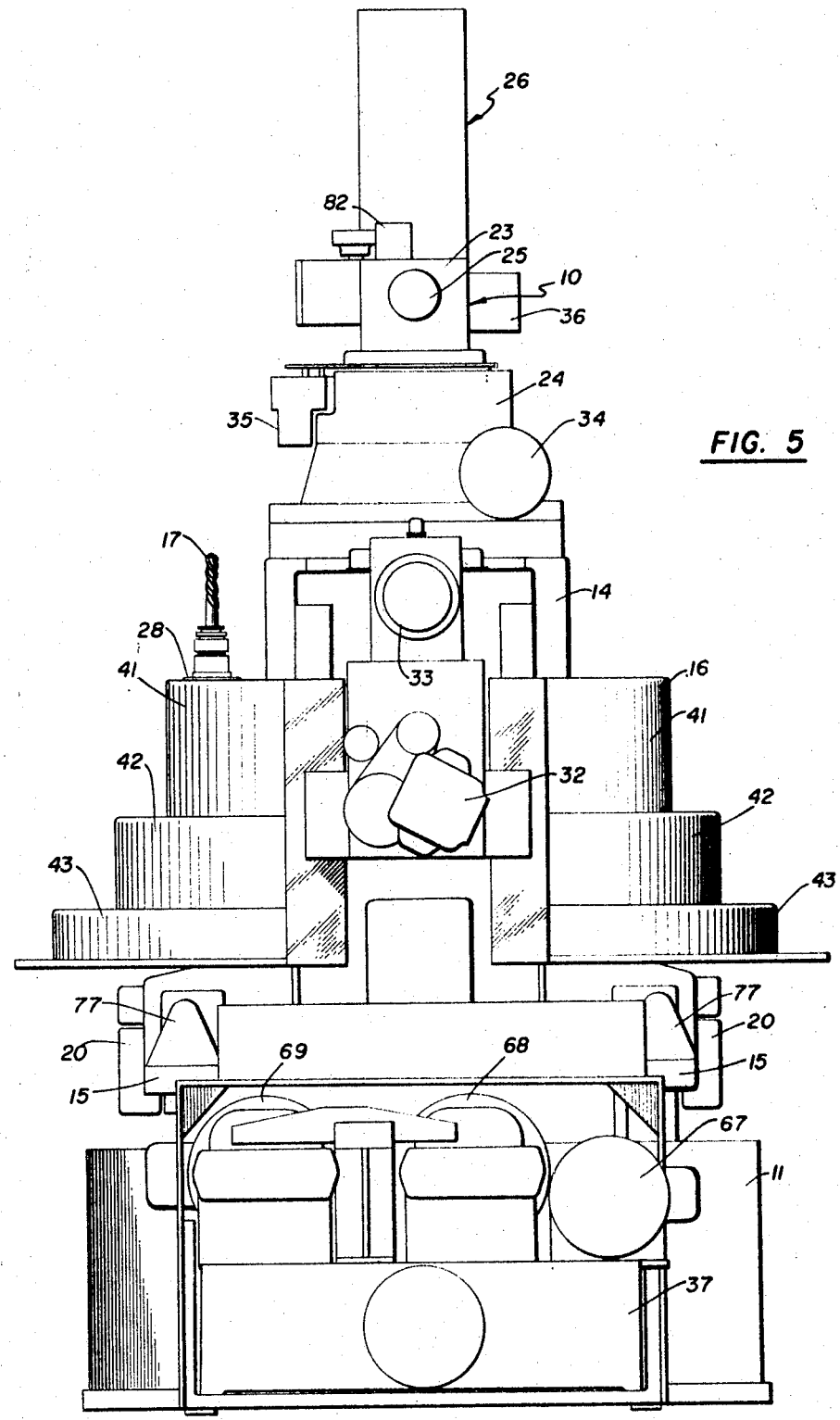
Figure 6:
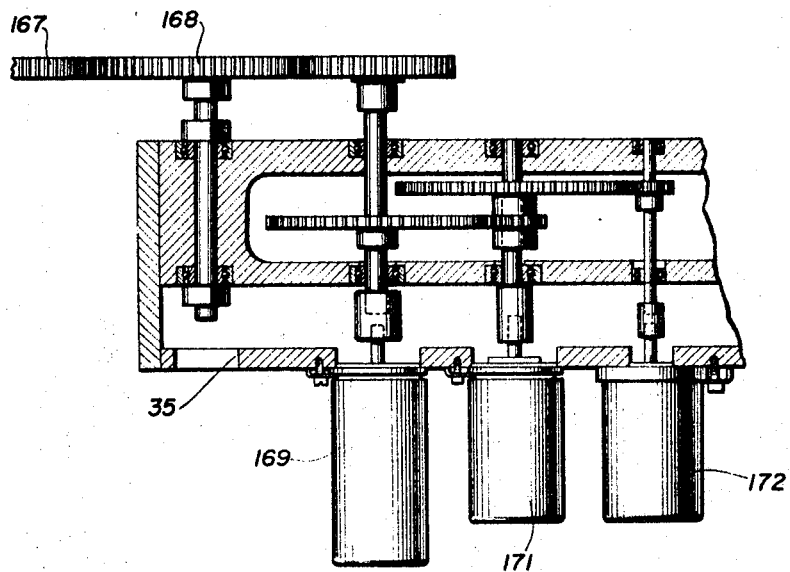
Figure 7:
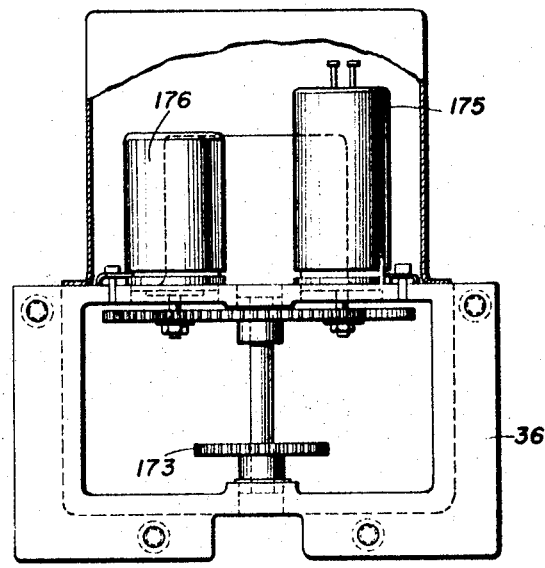
Figure 8:
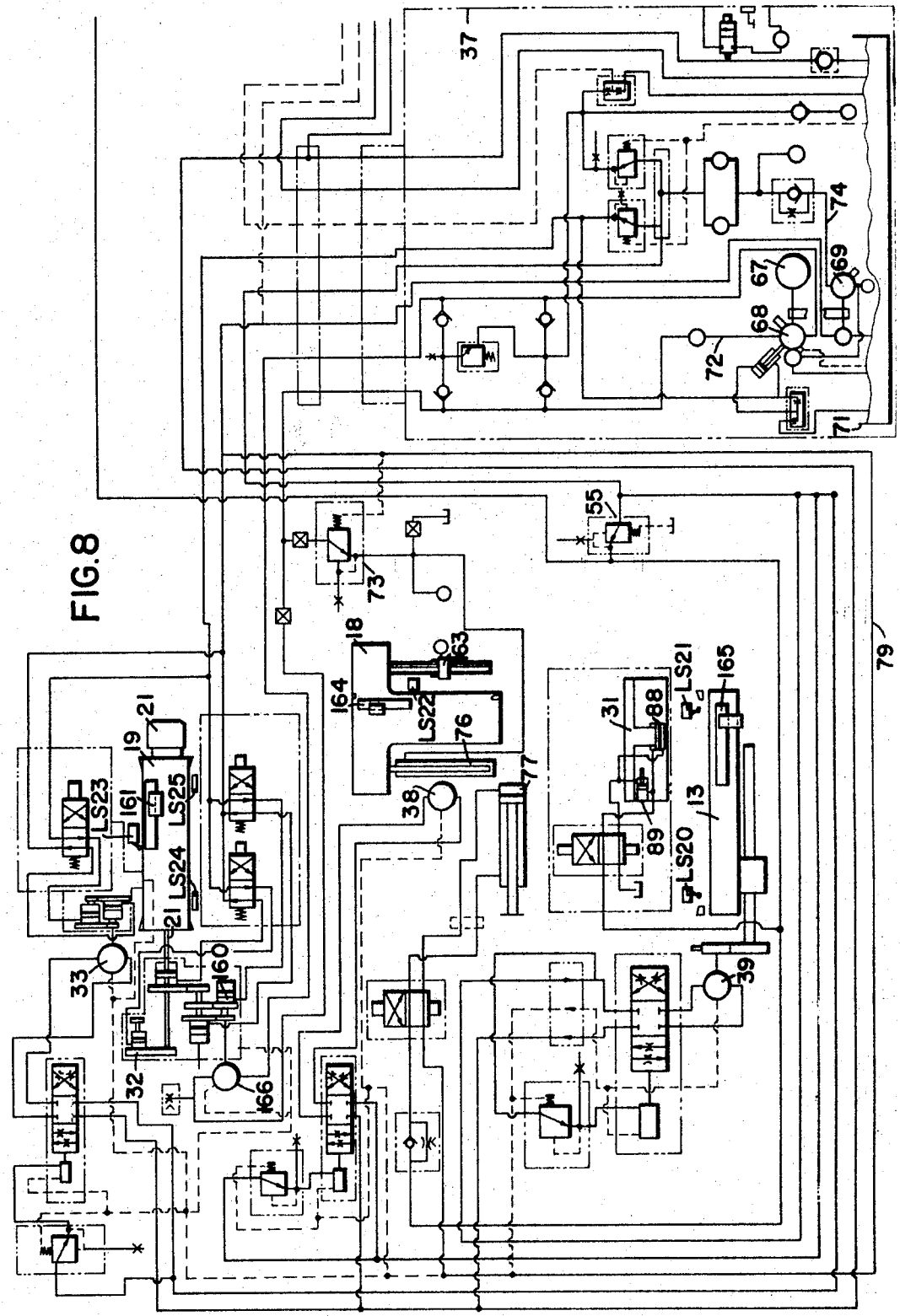
Figure 9:
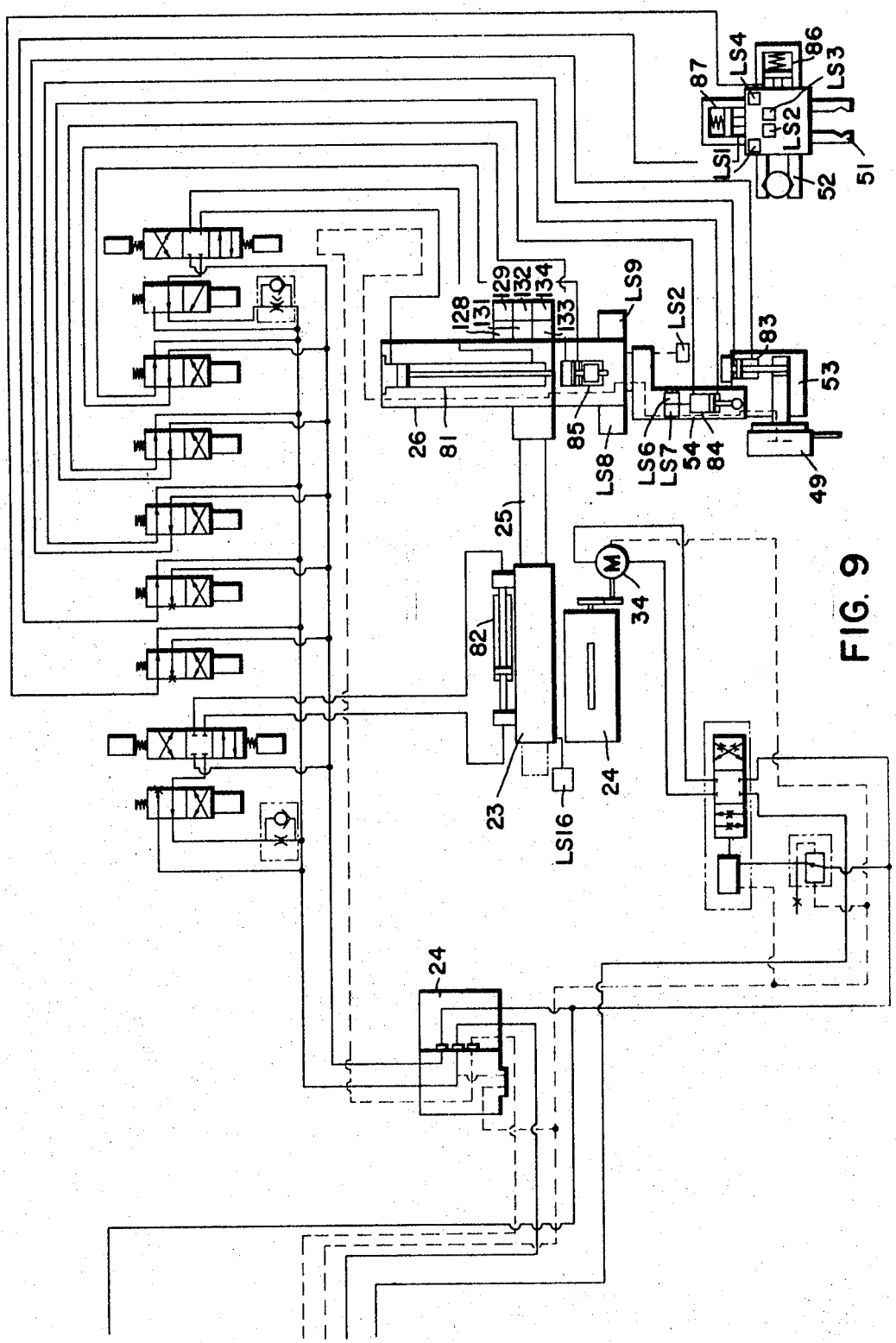
Figure 10:
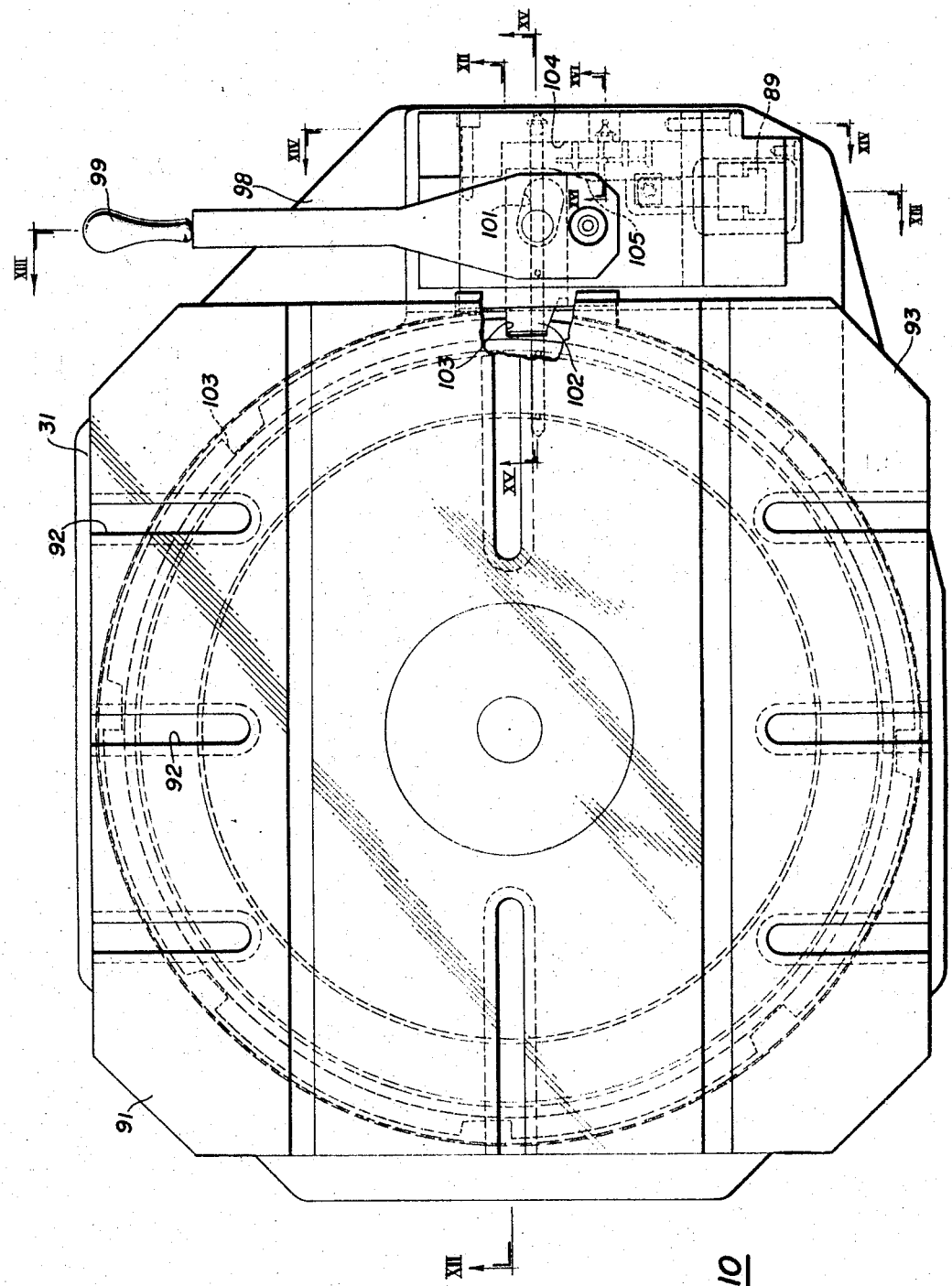
Figure 17:
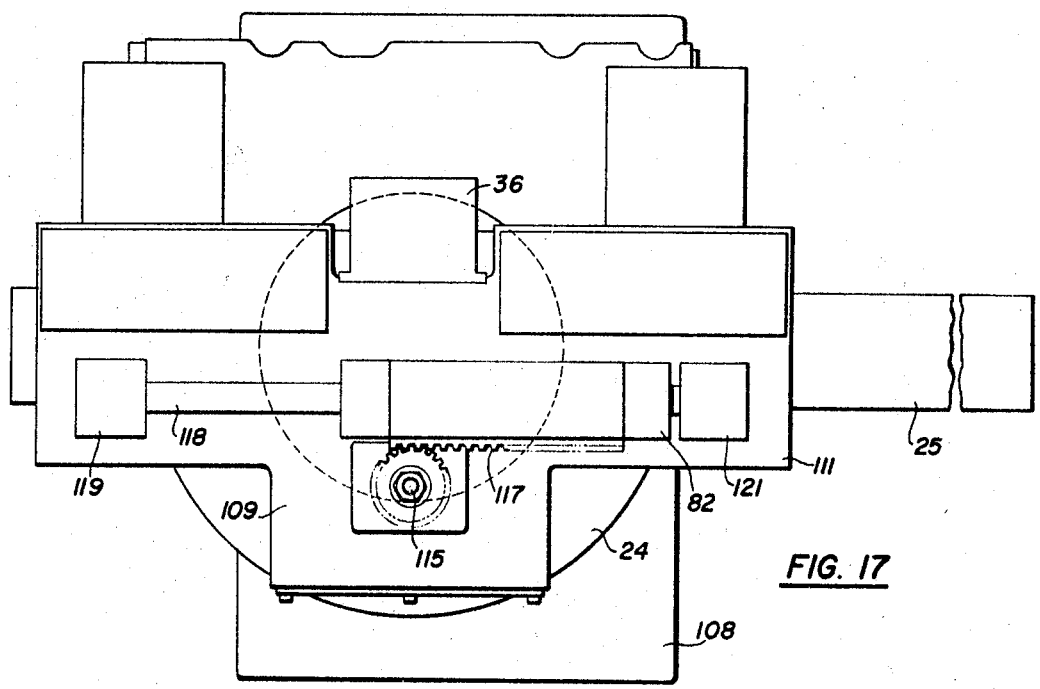
Figure 18:
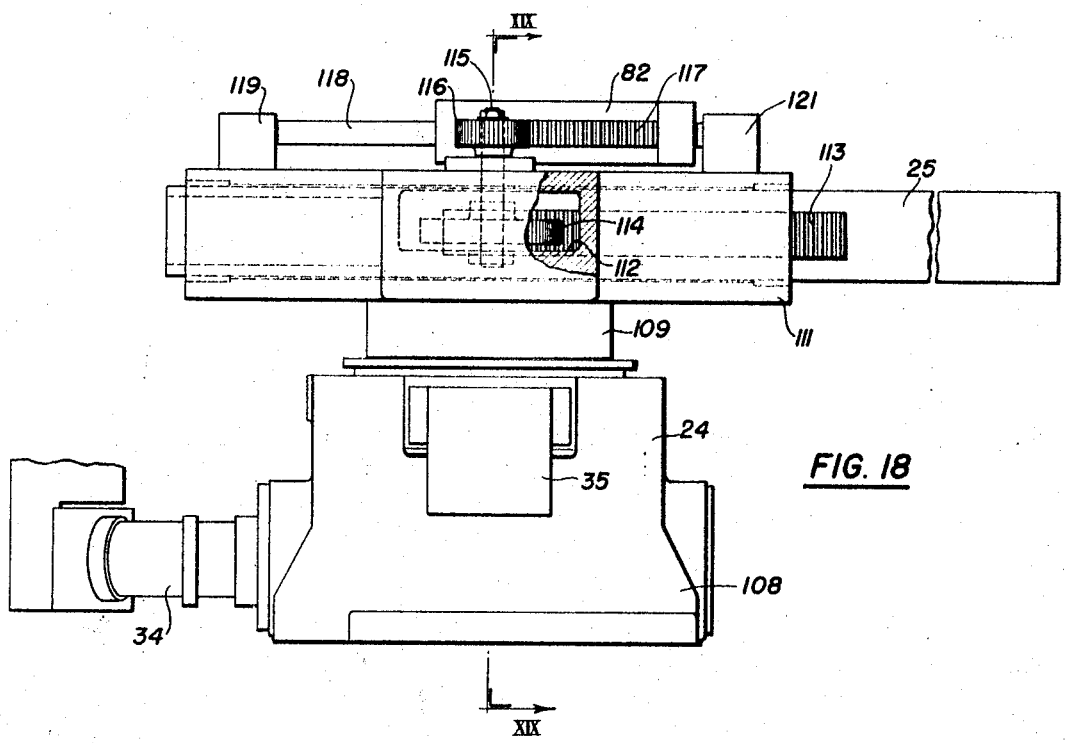
Figure 19:
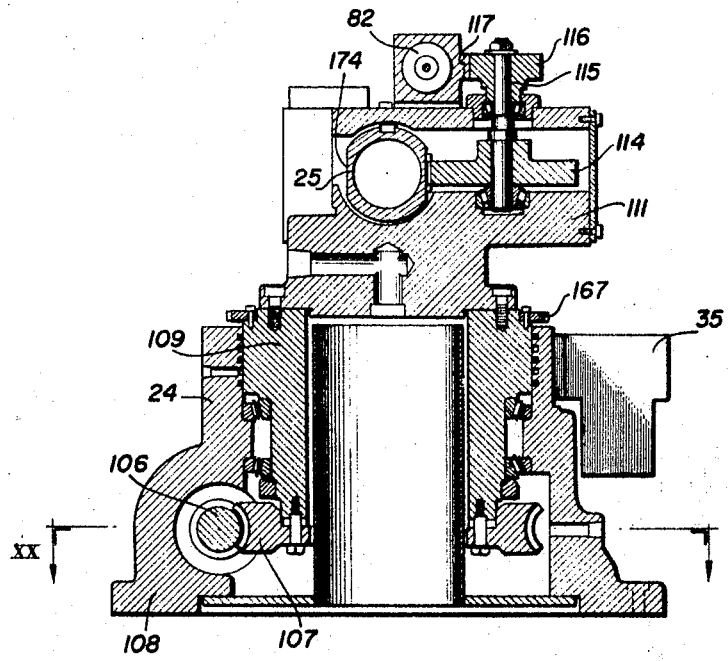
Figure 20:
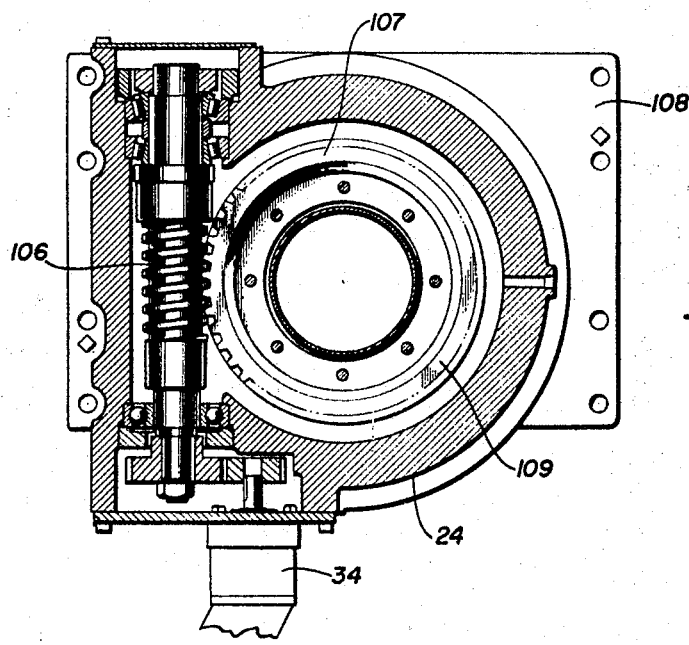
Figure 21:
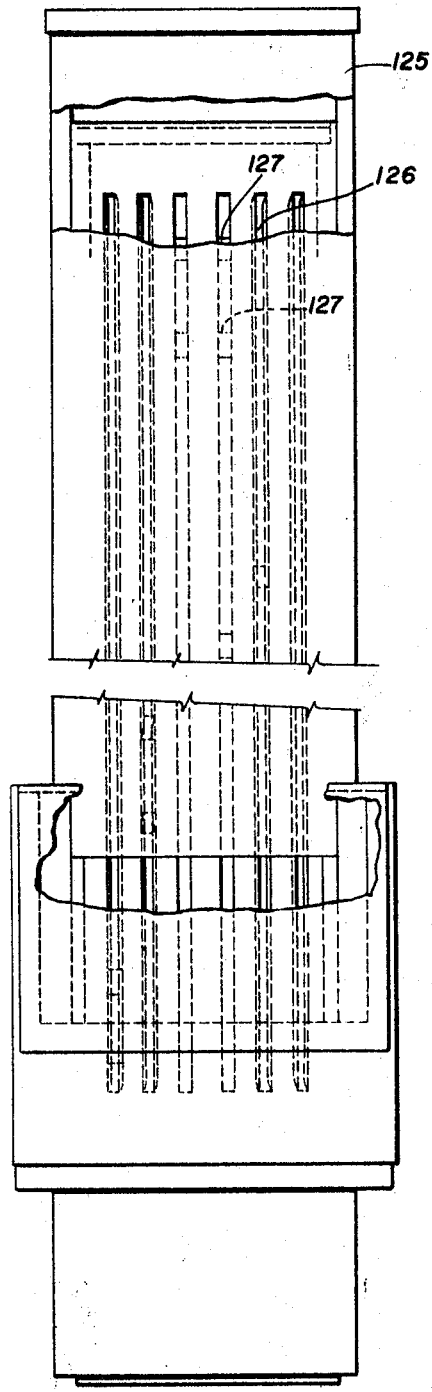
Figure 22:
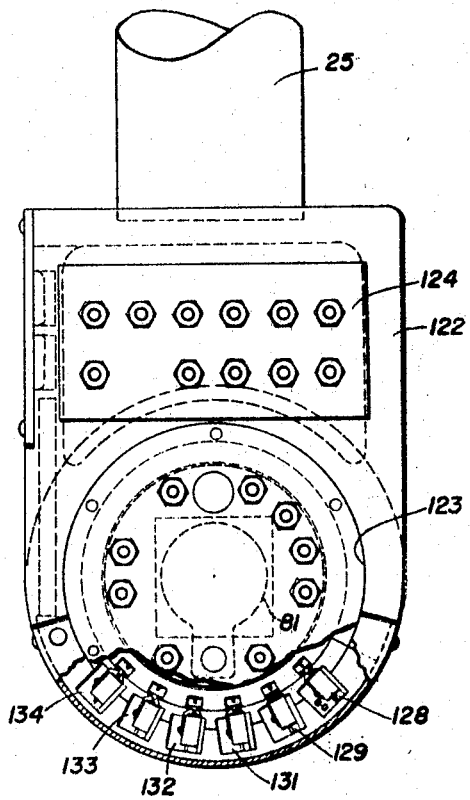
Figures 23, 24, 25:
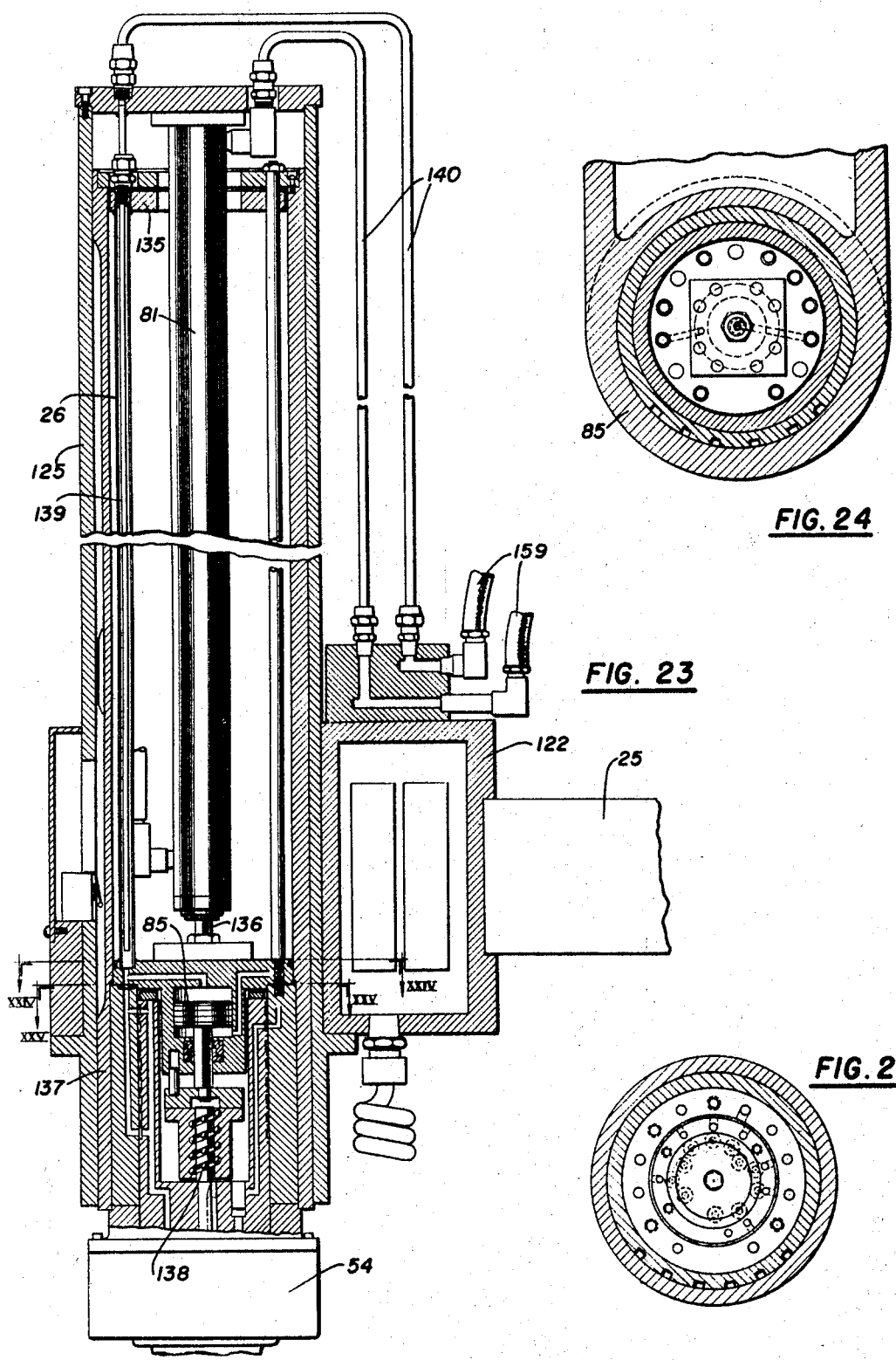
Figure 30:
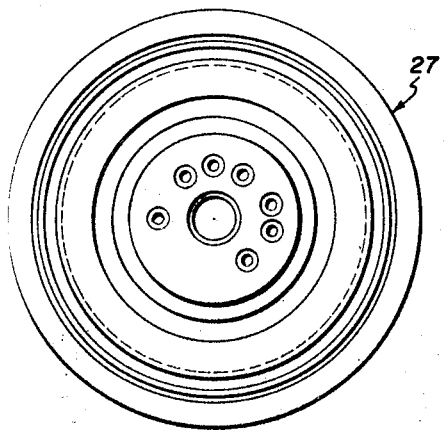
Figure 26:
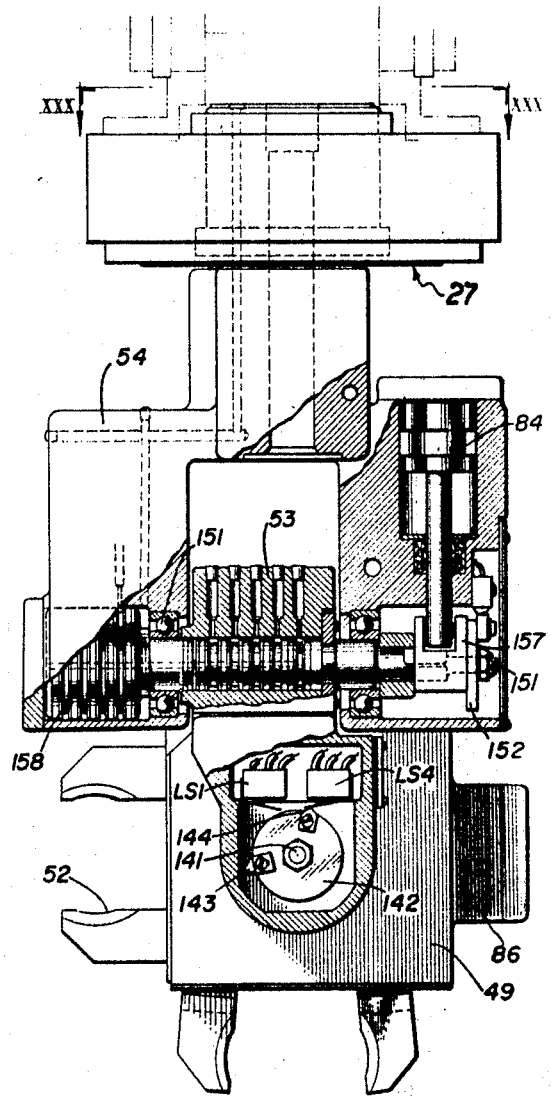
Figure 31:
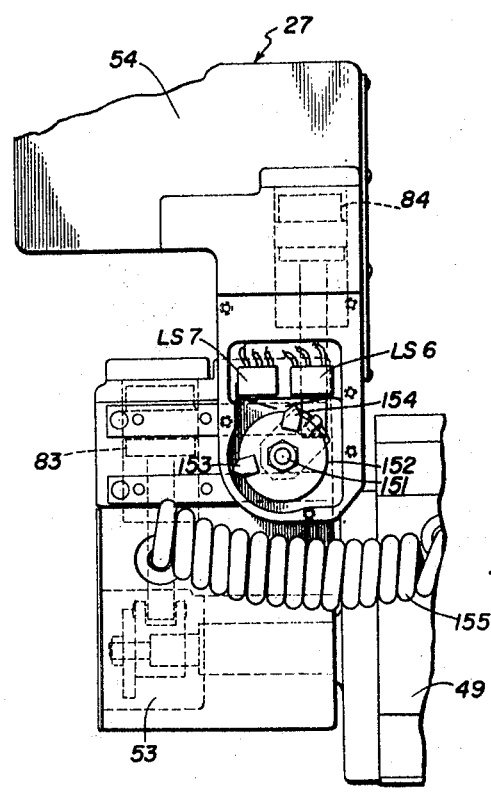
Figure 28:
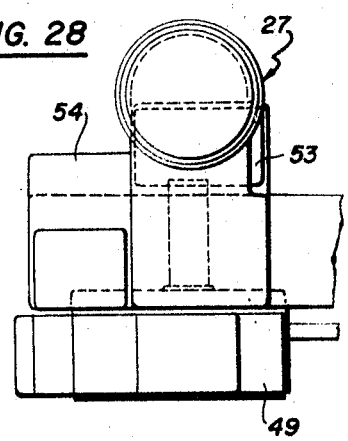
Figure 27:
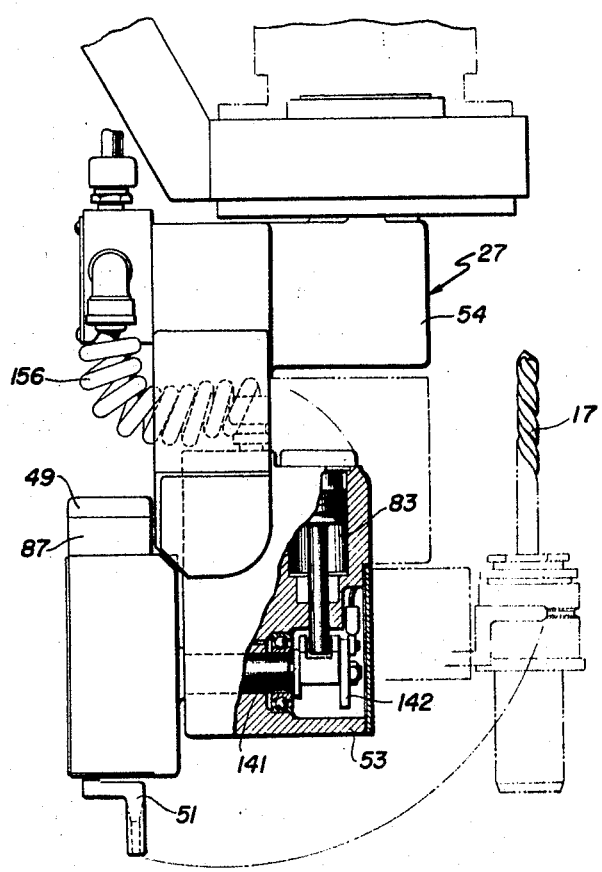
Figure 29:
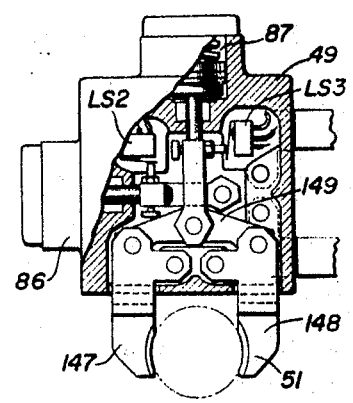

The character of the invention, however, may be best understood by reference to one of its structural forms, as illustrated by the accompanying drawings in which:

FIG. 1 is a perspective view of a machine tool incorporating the principles of the present invention, FIG. 2 is a side elevational view of the machine tool, FIG. 3 is a plan view of the machine tool, FIG. 4 is a front elevational view of the machine tool, FIG. 5 is a rear elevational view of the machine tool, FIGS. 6 and 7 are detailed sectional views of two feedback apparatus, the one shown in FIG. 6 being for the turret and the one shown in FIG. 7 being for the arm, FIGS. 8 and 9 are a schematic electrical-hydraulic diagram of a portion of the control apparatus incorporated in the machine tool, FIG. 10 is a plan view of a work table incorporated into the machine tool, FIG. 11 is a side elevational front view of the table, FIG. 12 is a sectional view of the invention taken on the line XII—XII of FIG. 10, FIG. 13 is a sectional view of the table taken on the line XIII—XIII of FIG. 10, FIG. 14 is a sectional view of the table taken on the line XIV—XIV of FIG. 10, FIG. 15 is a sectional view of the table taken on the line XV—XV of FIG. 10, FIG. 16 is a sectional of the table taken on the line XVI—XVI of FIG. 10, FIG. 17 is a plan view of a turret forming part of the machine tool, FIG. 18 is a side elevational view of the turret, FIG. 19 is a vertical sectional view of the turret taken on the line XIX—XIX of FIG. 18, FIG. 20 is a horizontal sectional view of the turret taken on the line XX—XX of FIG. 19, FIG. 21 is a front elevational view of the vertical slide housing incorporated in the machine tool, FIG. 22 is a plan view of the vertical slide housing, FIG. 23 is a vertical sectional view of the slide, FIG. 24 is a horizontal sectional view of the slide taken on the line XXIV—XXIV of FIG. 23, FIG. 25 is a horizontal sectional view of the column taken on the line XXV—XXV of FIG. 23, FIG. 26 is a front elevational view of an interchanger incorporated in the machine tool, FIG. 27 is a side elevational view of the interchanger, FIG. 28 is a top plan view of the interchanger, FIG. 29 is a sectional view of a portion of the front of the interchanger with covers removed, FIG. 30 is a sectional view of the interchanger taken on the line XXX—XXX of FIG. 26, FIG. 31 is a side elevational view of the interchanger taken from the side opposite the side shown in FIG. 27.

Referring first to FIG. 1, wherein is best shown the general features of the invention, the machine tool, indicated generally by the reference numeral 10, is shown as consisting of a base 11 of rectangular box-like conformation having a side 12 which, in the discussion which follows, will be considered the "front" of the machine. At the front of the base is located a work table 13 mounted on transverse ways for sliding motion parallel to the front wall 12. Mounted at the rear of the base 11 is a column 14 which is mounted on longitudinal ways 15 for motion toward and away from the front wall 12 along a capacity adjustment. Mounted on the exterior of the column 14 is a tool rack 16 carrying a series of tools, such as the tool 17.

Mounted in the column 14 and slidable vertically therein is a block 18. The block carries a cartridge 19 which, in turn, carries a rotatable spindle 21 in which is mounted a tool 22 shown in FIG. 2. The cartridge 19 is capable of horizontal longitudinal sliding motion relative to the block 18. Mounted on top of the column 14 is a tool changing apparatus 23 shown in FIG. 2.

Generally speaking, the tool changing apparatus consists of a turret 24 adapted to rotate about a vertical axis through the center of the column 14, an arm 25 mounted in the turret for sliding horizontal movement along a line extending through the said vertical turret axis, a vertical slide 26 mounted in one end of the arm 25 for vertical sliding movement along a line parallel to the said turret axis, and an interchanger 27. The interchanger is mounted on the lower end of the vertical slide 26 and is capable of rotative movement about a vertical axis, of swinging movement about a horizontal axis radial to the said turret axis, and of hinged movement about a horizontal axis perpendicular to a line radial to the said turret axis. The tool storage rack 16 is fixedly mounted exteriorly of the column and has a series of storage pockets 28, the tool changing apparatus 23 being operative to move a tool from a pocket 28 to the tool spindle 21 and vice versa.

FIG. 2 shows particularly well the way in which the table 13 is mounted on transverse ways 29 and is provided with a rotary index table 31. It particularly shows the manner in which the entire column 14 is movable along the ways 15 and it shows the spindle drive mechanism 32 including a rotary hydraulic motor 166 mounted at the rear of the machine. A similar rotary hydraulic motor 33 mounted at the rear of the machine regulates the movement of the cartridge 19 in and out of the block 18. Similarly, a rotary hydraulic motor 34 operates to rotate the turret 24. Mounted on the side of the turret 24 is a feedback apparatus 35 which generates an electrical signal indicative of the position of the turret 24 at all times. A similar feedback apparatus 36 is mounted on the top of the turret beside the arm 25 to indicate the longitudinal position of the arm 25 in its horizontal motion radial of the axis of the turret. Mounted at the back of the machine is hydraulic fluid source 37 for producing hydraulic fluid under pressure for use in the various parts of the machine. Adjacent it at the rear of the machine is a hydraulic motor 38 which serves to produce the vertical motion of the block 18 within the column 14.

FIG. 3 shows particularly well the hydraulic motor 39 which serves to move the table 13 along its ways 29. It also shows the manner in which the tool rack 16 is arranged in such a way that the pockets 28 lie in a circle concentric with the turret axis, the pockets being formed to hold the stored tools with their axis vertical and provided with a nylon sleeve to prevent damage to the tool. Actually, a plurality of tool storage racks are provided, each rack having a row of storage pockets arranged to hold the tools with their axes lying in a circle concentric with the axis of the turret. The racks are formed so that the circles are successively larger, each rack being located a substantial distance along the axis from the position of the next adjacent inner rack, so that the racks give the appearance of a series of concentric steps arranged around the column 14. For instance, on one side of the column, there is a circular segmental storage row 41 which is closest to the column 14, which has the smallest radius, and which is the highest of the racks. Concentric with the row 41 is a storage row 42 which has a larger radius but is at a lower level than the row 41, so that its tools do not extend up to the surface of the row 41. Finally, a third or outer storage row 43 has an even larger radius than the row 42 and is at an even lower level in such a way that the upper ends of its tools do not extend up to the level of the row 42. FIG. 3 (which shows the machine with the tool changer 23 removed) indicates very clearly the way which the column 14 is formed as two massive spaced uprights with a tie at the bottom having a gap 44 between them and another tie plate across the top. It is in this gap 44 that the block 18 is mounted and it is clear in this view that the column is provided with forward ways 45 and inner ways 46 which serve to guide the block 18 in its vertical movement.

FIG. 4 shows particularly well the manner in which the slide 19 is mounted for horizontal starting motion relative to the block 18. The slide has a generally square cross-section and is provided with wing blocks 47 and 48 which slides in slots provided therefor formed in the block 18. The slide 19 has its weight supported on the wing blocks 47 and 48 extending into grooves on the sides of a recess formed in the block 18. A third key block 177 slides in a groove in the bottom of the recess formed in the block. Now, the wing blocks 47 and 48 have slack at the sides so that they can expand sideways, while the block 117 has slack in the downward direction so that it can move downwardly. The block 177 keeps the spindle centered, while the blocks 47 and 48 provide the vertical positioning Irrespective of the heating in the spindle and cartridge, no amount of expansion and contraction will change the centerline position of the spindle. This figure also shows the manner of mounting the feedback apparatus 35 and the feedback apparatus 36. The interchanger 27 is shown as having a swing plate 49 which carries two sets of tool holding members 51 and 52 mounted at 90° to one another relative to the horizontal axis of swining of the plate 49. This axis is horizontal and is radial to the turret axis. Pivotally attached to the swinging plate 49 is a hinge plate 53, the upper end of which is attached to a rotary plate 54 which, in turn, is attached to the bottom end of the vertical slide 26.

FIG. 5 shows the rear of the machine with the spindle drive mechanism 32. Particularly well shown are the motors 45, 33, 32, and 38 and the cylinders 77 for column adjustmust. The step-like arrangement of the tool storage rack is clearly indicated.

In FIG. 6 are shown the details of the feedback apparatus 35 which transmits to the electrical controls a continuous indication of the angular position of the turret 24. A gear 167 mounted on the rotatable portion 109 of the turret 24 engages an input gear 168 in the feedback apparatus 35. A gear train serves to operate and rotate the shafts of a potentiometer 169, a resolver 171, and a tachometer 172. The tachometer 172 transmits to the electrical controls an indication of the rate of rotation of the turret. The potentiometer 169 gives a crude electrical indication to the electrical controls of the angular position of the turret, while the resolver 171 gives a fine and very accurate indication of the angular position.

In FIG. 7 is shown the feedback apparatus 36 which sends to the electrical control apparatus an indication of the position of the arm 25 relative to the turret axis at all times. An input gear 173 engages a rack 174 (see FIG. 19) formed on the side of the arm 25. This operates through a gear system to rotate the shafts of a potentiometer 175 and a resolver 176. The potentiometer 175 gives a relatively coarse indication of the position of the arm 25, while the resolver 176 is a very accurate indication.

FIGS. 8 and 9 show the hydraulic interconnections between the various parts of the machine. Generally speaking, those hydraulic parts shown in FIG. 8 have to do with the various motions of the table 13, the column 14, the block 18, the slide 19, and the spindle 21, while those elements in FIG. 9 tend to be connected with the operation of the tool changing apparatus 23. First of all, in FIG. 8 is shown the hydraulic source 37 which includes a main electric motor 67 which operates a pump 68 and a pump 69 operating out of a sump 71. From the pump 68 extends a high pressure line 72 which, in the preferred embodiment, operates through a pressure-compensating valve to give 3,000 p.s.i. The pump 69 operates into a line 74 and operates through a pressure-regulating valve 55 to give 500 p.s.i. fluid. The line 72 is connected mainly to the hydraulic motor 166 which drives the spindle through through a conventional gear box 160. It is also connected to charge the accumulation, after going through a pressure-regulating valve 73, to balancing cylinders 76 which operate on the block 18 to counterbalance its weight to assist vertical sliding motion within the column 14. After the system is charged, the connection is closed off. The horizontal linear hydraulic cylinders 77 are provided to move the column 14 along the ways 15 on occasion and this cylinder is connected to the 500 p.s.i. line 74 after fluid has passed through the pressure-regulating valve 55. The hydraulic motor 39, which operates the work table 13 for horizontal transverse motion is suitable connected to 1200 p.s.i. line and, of course, to the drain line 79.

Located on FIG. 9 is the turret hydraulic motor 34. A hydraulic cylinder 81 provides for vertical movement of the slide 26 relative to the arm 25 of the tool changing apparatus 23. A hydraulic cylinder 82 operates the arm 25. A hydraulic cylinder 83 is located in the hinge plate 53 to operate the swing plate 49. A hydraulic cylinder 84 is mounted in the rotary plate 54 to operate the hinge plate 53. A hydraulic cylinder 85 is mounted in the post 26 to operate the rotary plate 54. A hydraulic cylinder 86 is located in the swing plate 49 for operating the tool holding member 52, while a hydraulic cylinder 87 is also mounted in the swing plate 49 to operate the tool holding member 51.

In order to understand the hydraulic diagram in FIGS. 8 and 9 better, it might be well to refer to the main hydraulic motors and cylinders by relating them to other drawings in which these elements appear. The hydraulic motor 33 which serves to bring about travel of the slide 19 is also shown in FIGS. 2 and 5. The motor 38 which brings about the operation of the block 18 within the column is shown in FIG. 2. The adjustment cylinders 77 which adjust the column 14 along the ways 15 are shown in FIGS. 2 and 5 and lie horizontally over the two ways 15 on the top of the base 11. The hydraulic motor 39 which brings about the travel of the work table 13 is shown in FIGS. 3 and 4. The hydraulic motor 34 which brings about rotation of the turret 24 is shown in FIGS. 2, 4, 5, 18, and 20. The cylinder 82 which brings about the horizontal radial motion of the arm 25 is shown in FIGS. 2 and 5, as well as FIGS. 17, 18, and 19. The cylinder 81 which brings about the vertical motion of the slide 26 parallel to the axis is shown in FIGS. 22 and 23. The cylinder 85 which brings about rotational movement of the rotary plate 54 about a vertical axis is shown in FIGS. 23 and 24. The cylinder 84 which brings about 90° motion of the hinge plate 53 is shown in FIGS. 26 and 31. The cylinder 83 which brings about the 90° motion of the swing plate 49 is shown in FIGS. 27 and 31. The cylinder 86 which brings about the unclamping operation of the tool holding member 52 is shown in FIGS. 26 and 29, while the cylinder 87 which operates the tool holding member 51 is shown in FIGS. 27 and 29. Further reference to the various limit switches and control devices associated with the parts of the machine will refer back to FIGS. 8 and 9 as the description of individual parts of the machine progresses. The rotary index table 31 mounted on the work table 13 is provided with a cylinder 88 (see FIG. 12) to relieve the table of load on its bearings during rotation and a cylinder 89 (see FIG. 13) to provide for locking.

Referring now to FIGS. 10, 11, 12, 13, 14, 15, and 16 which show the details of the rotary index table 31, it can be seen that it consists of an upper portion 91 which is provided with slots 92 (to which the workpiece is intended to be fastened) and a lower portion 93 which is intended to be bolted to the upper surface of the work table 13. The upper portion is provided with a circular way 94 which is attached to the upper portion and which rests on the lower portion to support a substantial part of the weight. Additionally, the lower portion is provided with the cylinder 88 having a piston 95 which carries the inner race of a ball bearing 97, the outer race of which is carried by the upper portion 91. The introduction of oil into the cylinder 88 at the bottom side of the piston 95 serves to remove the weight from the bearing 97 and from the way 94 during rotation of the table with a heavy workpiece bolted to its upper side. Extending laterally from the lower portion 93 is an abutment 98 on the top of which is pivotally mounted a handle 99. This handle is provided with a slot 101 whose side surfaces are inclined slightly to a line radial to the center of the table and this slot engages a pin on a detent finger 102 which is slidably mounted in the abutment 98 for radial movement for engagement with one of a series of notches 103 spaced every 45° about the periphery of the upper portion of the table. The notches 103 are formed in the outer periphery of the ring-like way 94. Slidable in the abutment at right angles to the direction of movement of the detent finger 102 is a cam bar 104 having an inclined surface 105 which mates with and slides along a corresponding surface at the rear end of the detent finger 102. Finally, the cylinder 89 is provided in the abutment to press the cam bar 104 into such a position as to lock the finger 102 in the notch 103. Suitable springs are provided to press the finger into place normally, but the handle 99 operating through the slot 101 is able to pull the finger from the notch 103 in order to permit rotation of the table.

FIGS. 17, 18, 19, and 20 show the details of the turret 24 and the arm 25. The motor 34 is connected through gearing to a worm 106 which engages a worm wheel 107. The turret consists of a main body 108 which is bolted to the top of the column 14 and a rotatable portion 109 which carries the worm wheel 107 for the rotation thereof. The upper portion 109 is provided with a suitable sleeve 111 in which the arm 25 (which is circular in cross-section) is slidably mounted. The sleeve 111 is provided with a window 112 behind which lies a rack 113 formed on the side of the arm 25. Mounted on the sleeve for rotation about a vertical axis is a gear 114 which engages the rack and which lies on a vertical shaft 115 which has mounted on its upper end a gear 116. This gear is engaged by a rack 117 which is mounted on the side of the body of the cylinder 82. Now, the piston associated with the cylinder is provided with a rod 118 which extends from both ends of the cylinder 82. The ends of the rod are firmly fastened in abutments 119 and 121 extending from the top of the sleeve 111. The turret feedback apparatus 25 is mounted on the side of the fixed main body 108 of the turret, while the arm feedback apparatus 36 is mounted at the rear of the sleeve 111, a rack similar to the rack 113 being formed on the back of the arm 25 for use in performing the feedback function; that is to say, the feedback box 35 always knows the angle at which the upper portion 109 of the turret is positioned about the axis, while the feedback apparatus 36 always knows the longitudinal position of the arm 25 in the sleeve 111.

FIG. 21 shows the general arrangement of the slide 26 as it is mounted at the outer end of the arm 25. The arm 25 is provided at its outer end with a box-like housing 122 having a vertical bore 123 in which the slide is mounted. An electrical junction box 124 is also provided in the housing 122. Extending upwardly from the housing 122 is a tubular casing 125 which remains fixed and supports the cylinder 81 while the slide 26 moves up and down. As is evident in FIG. 21, the outside surface of the post (which is a hollow tube) is provided with rods 126 on which are cams 127 for engagement with limit switches. These limit switches are mounted on the inside of the guard 122 in position to be engaged by the cams 127 on the post 26 as it moves vertically up and down. The limit switch 128, for instance, is a SLOWDOWN-THIRD RACK limit switch, while mounted in a circle are other limit switches, such as the limit switch 129 which is a STOP-SECOND RACK limit switch, a limit switch 131 which is a SLOWDOWN-SECOND RACK limit switch, a limit switch 132 which is a STOP-TOP RACK limit switch, a limit switch 133 which is a SLOWDOWN-TOP RACK limit switch, and an upper limit switch 134. These are all arranged in a circle within the housing 122 in position to be engaged by one of the cams 127 of one of the grooves 126 and are used in slowing down the motion of the post as it approaches a certain level and for bringing about the end of a stroke at that particular level.

FIGS. 23, 24, and 25 show the internal workings of the slide 26 and associated equipment. The slide 26, in general, consists of a tube having a cap 135 extending across its upper end and slides around the cylinder 81. The piston rod 136 of the cylinder extends from its lower end and is fastened to a block 137 mounted at the lower end of the tubular portion of the slide 26. This block, of course, carries the cylinder 85 and associated equipment. The piston of the cylinder 85, incidentally, operates through a helical ball screw 138 to cause rotation of the rotary plate 54 of the interchanger 27, which rotary plate is rotatably mounted at the bottom end of the post. Pressure oil for the operation of the interchanger apparatus arrives from the housing 122 by means of rigid conduits 140 which enter a top plate at the upper end of the casing 125. The oil then proceeds to the bottom of the post 26 through telescoping tubes 139. This oil is commutated into the rotatable part of the rotatable plate 54 of the interchanger in the manner suggested in FIG. 25 in which the telescoping tubes 139 are connected to vertical passages, each vertical passage of which is connected to a horizontal groove on an inter-rotatable part of the bottom end of the post, which horizontal groove, in turn, is connected to another vertical groove extending into the top of the interchanger. The vertical passages are associated with various functions of the interchanger, such as tool holding members 51 and 52, swing plate rotate 90°, swing plate reset, hinge plate rotate 90°, hinge plate reset, and drain. referring to various motions of the tool holding members 51 and 52, the hinge plate 53, and the rotary plate 54, as well as the swing plate 49 and serve to present oil to these members for the operation of the cylinders 85, 84, 83, 86, and 87.

The details of the interchanger 27 are shown in FIGS. 27, 28, 29, 30, 31, and 26. This consists, first of all, of the swing plate 49 which carries the tool holding members 51 and 52 operated by the cylinders 87 and 86, respectively. The swing plate 49 is connected for swinging motion about a horizontal axis which is radial to the main turret axis by means of a shaft 141. This shaft carries at its outer end a cam plate 142 having cam fingers 143 and 144 mounted at its outer periphery and adapted to engage limit switches LS1 and LS4 mounted in the swing plate.

As is evident in FIG. 29, the tool holding member 51 consists of two fingers 147 and 148 hingedly connected to the swing plate and having bellcranks at their upper ends joined by a toggle 149. The piston of the cylinder 87 engages this toggle and serves to open and close the fingers 147 and 148. The operation of the toolholding member 52 works the same way through the medium of the cylinder 86. Limit switches LS2 and LS3 indicate the condition of these tool holding members 51 and 52; that is to say, whether they are open or closed. Similarly, the limit switches LS1 and LS4 indicate the position of rotation of the swing plate 49 relative to the hinge plate 53 to which it is attached. The connection, incidentally, between the cylinder 83 and the shaft 143 for the rotation of the swing plate 49 is by means of a bellcrank, as best shown in FIG. 27. The manner in which the hinge plate 53 is hingedly attached to the rotary plate 54 is best shown in FIG. 26 where it is seen that a shaft 15 is rotatable on an axis perpendicular to a radius line and perpendicular to the axis of the shaft 141. It is operated to rotate the hinge plate 53 by means of the cylinder 84 through a bellcrank 157. This shaft is also provided at one end with a cam plate 152, at the otuer periphery of which are mounted cams 153 and 154 adapted to engage limit switches LS7 and LS6.

In FIG. 31 can be seen the manner in which a flexible cable 155 containing the limit switch wires joins the swing plate 49 and the hinge plate 53 without inhibiting their mutual motion. In a similar way, in FIG. 27 a cable 156 is shown as joining the hinge plate 53 to the rotary plate 54 without preventing their relative motion. The passage of oil between the rotary plate 54 and the hinge plate 53 takes place through a commutation drum 158 shown in FIG. 26 at the end of the shaft 151 opposite the end carrying the bellcrank 157 and the cam plate 152.

Returning to a description of FIGS. 8 and 9, it can be seen that a limit switch LS2 is mounted on the forward end of the cartridge 19 to indicate when the column and the interchanger have reached a low position adjacent the spindle 21 and the tool 22. Furthermore, limit switches LS9 and LS8 are located to indicate rotational positions of the interchanger about its vertical pivotal axis. In addition, the six limit switches 128 through 134 are shown schematically in these views as associated with the post 26. Referring to the arm 25, a limit switch LS16 is arranged to indicate its extreme position. In FIG. 9 and also in FIG. 19 is shown the manner in which pressure oil is brought into the tool changer apparatus through the turret 24. Grooves on the inner bore of the main body 108 serve a commutating function and carry oil from the main part of the machine tool up into the rotatable portion 109 of the turret from which it passes through flexible tubes 159 (see FIG. 23) into the housing 122 at the end of the arm 25 and from there through the tubes 138 into the post 26 and, eventually, into the interchanger, as has been described before.

Referring to FIG. 8, limit switches LS24 and LS25 are provided to show the extreme positions of the cartridge 19 in its horizontal travel, while limit switch LS23 indicates an intermediate position. However, accurate location of the cartridge relative to the block 18 in which it slides and to the base 11 of the machine is determined by use of a Farrand scale 161. This instrument is a linear triple inductosyn or LVDT in which the voltage coming from the scale is indicative of the displacement between its two parts. This type of accurate measurement of linear position is well known in the art and need not be described further. The limit switch LS22 is located adjacent the block 18 to indicate the limits of its vertical positioning. The hydraulic motor 162 drives a nut-and-screw arrangement 163 to raise and lower the block 18. A Farrand scale 164 is provided to give an accurate indication of the vertical position of the block 18 within the column. The limit switch LS20 and a limit switch LS21 are located adjacent the table 13 to indicate the limits of its movement and it is provided with a Farrand scale 165 to give an accurate signal of its position relative to the base 11. In the upper part of FIG. 8 can be seen the spindle drive mechanism 32 including the gear box 160 which permits the hydraulic motor 166 to drive the spindle 21, while the hydraulic motor 33 operates to move the cartridge 19 in its horizontal movement relative to the block 18. The electric signals resulting from the operation of the Farrand scales 161, 164, and 165, as well as the opening and closing of the various limit switches, are all carried back into an electrical control system operated by numerical control means, which control is well known in the art and need not be described in detail in connection with the present application. This electrical control system serves to energize the various electro-hydraulic servo valves shown in FIGS. 8 and 9 to operate the various hydraulic cylinders and motors.

The operation of the machine tool with now be readily understood in view of the above description. The operator first actuates the electrical controls setting the motor 67 in operation so the pumps 68 and 69 produce pressure oil for all systems. The index table 31 has a workpiece mounted on it and it has been rotated by hand to a desired angular position. It has then been locked in place by the operation of the cylinder 89 to fix the locking finger 102 in place in its notch 103. The column 14 is adjusted along its ways 15 by means of the cylinder 77 and is locked in place on the base 11 at a predetermined position by clamps 20 (see FIG. 5). Its advance in this way carries with it the block 18, the cartridge 19, the spindle 21, the tool 22 and, of course, the tool changing apparatus 23, as well as the tool rack 16. Oil is automatically introduced into the balancing cylinders 76 (see FIG. 4) so that the block 18 is capable of vertical movement without undue stress on the relatively delicate nut-and-screw arrangement 163 which is used for its vertical movements. Assuming that the tool 22 is in place, the electrical controls which are fed with information from a tape in the well-known manner locate the block 18 in its vertical position by actuating the hydraulic motor 162 until the Farrand scale 164 indicates that the desired vertical position of the centerline of the spindle 121 has been reached relative to the workpiece mounted on the index table 31. The hydraulic motor 166 is operative to rotate the spindle 21 at the desired end of the tool 22 at the desired speed. At this point in the proceedings, the centerline of the spindle 21 should be in alignment with the bore to be finished on the workpiece. At that time, it is only necessary to advance the cartridge 19 in order to perform the machining operation. The cartridge would be advanced under the impetus of the hydraulic motor 33 at rapid traverse until the tool is close to the workpiece and from then on it would be advanced at the desired feed speed for the machining operation. When the machining operation has been completed, the cartridge 19 is withdrawn by reversal of the train of gears from the motor 33 at which time the cartridge 19 is returned to a rearward position somewhat similar to that shown in FIGS. 1 and 2 of the drawings.

The tool changing apparatus 23 now goes into operation to remove the tool 22 and replace it with a new tool. However, while the machining operation has been going on with the old tool 22, the tool changing apparatus has already picked up a new tool. For instance, let us assume that it has been picking up the tool 17 shown in FIG. 1 in the second row 42 of the tool rack 16. Oil is introduced into the cylinder 84 to rotate the hinge plate 53 90° to bring the tool holding members 51 and 52 into a horizontal plane and oil is introduced into the cylinder 83 to operate the swing plate 49 to cause the tool holding member 52 to face inwardly. The cylinder 85 has previously been actuated to assure that the rotary plate 54 is in the outer position. The final position, therefore, of the elements is that the rotary plate 54 is in the outer position, the hinge plate 53 has been swung to the up position carrying the swing plate 49 into a generally horizontal plane along with the tool holding members 51 and 52; the tool holding member 51 now faces toward the axis of the turret. The cylinder 82 is actuated to move the arm 25 until the tool engaging members are well outwardly of the radius of the second step 42 of the tool rack 16 which is the step which carries the new tool 17 in a pocket 28. The cylinder 81 is operated to cause the post to move downwardly and carry the interchanger with it until it reaches the point where the tool holding member 51 is on the same level with an annular clamping groove on the tool 17. Then, the cylinder 82 is operated to move the interchanger inwardly on a radius to the axis of the turret. Previously, however, the turret motor 34 has been operated to swing the entire turret and interchanger apparatus around to the proper angle occupied by the tool 17, so that as the arm 25 carries the interchanger inwardly it eventually engages the tool 17 and grasp it.

In order to grasp the tool, it is necessary to introduce oil into the motor 87 to open up the fingers of the tool holding member 52. Then, when the fingers are around the groove in the tool 17, the oil is released, allowing the springs associated with the motor 87 to take over and cause the fingers to clamp resiliently around the tool. Now, with the tool in its grasp, the tool changer moves vertically upwardly under the impetus of the cylinder 81 and swings around by the operation of the turret motor 34 until it occupies the position directly above the spindle 21 and the old tool 22. At this time, the cylinder 83 is actuated to cause the swing plate 49 to rotate through 90° so that the new tool is facing sideways while the tool holding member 51 now faces radially. Then, the cylinder 84 is operated to cause the hinge plate 53 to move downwardly so that the swing plate is now in a vertical plane with the tool holding member 52 facing downwardly and the tool holding member 51 facing to one side. Then, the motor 85 is actuated to cause the rotary plate 54 to rotate about the axis of the post 26 so that the swing plate 49 occupies a position facing toward the machine. If one refers to FIG. 9, the arrangement of the parts shown there is the way they exist at this point in the proceedings, if the column 14 is to the left of the swing plate 49. Now, the arm 25 is operated to move the whole interchanger assembly inwardly so that the tool holding member 52 now lies directly above the groove in the old tool 22. At that time, the cylinder 81 is operated to move the whole interchanger downwardly until the fingers of the tool holding member 52 embrace the groove in the old tool 22. Of course, it is necessary to introduce oil into the cylinder 86 to cause the fingers to move outwardly until they lie outside of the groove in the tool and then the oil is released so that the springs take over and cause the fingers to snap into the groove and grasp the old tool 22. Suitable means is provided for releasing the chuck which holds the tool in the spindle 21 and the arm 25 is operated so that the entire interchanger moves radially toward the front of the machine carrying the old tool out of the chuck. Then, the swing plate 49 is rotated by the cylinder 83 through 90° carrying the old tool away from the centerline of the spindle and moving the tool holding member 52 with its new tool 17 into axial alignment with the psindle. Then, the cylinder 82 is actuated again to carry the arm 25 radially inwardly to place the new tool in the chuck on the spindle. The chuck is operated to grasp the tool, the cylinder 87 is operated to release the fingers of the tool holding member 51, and the interchanger is then moved vertically upwardly by the cylinder 81. It is moved upwardly into the position shown in FIG. 1 out of the way and the next stage of the machining cycle begins with the new tool 17 taking part in the machining operation.

It can be seen, then, that the present machine tool offers extreme versatility with rugged construction and simplicity of operation. The arrangement of tool rack and tool changer permits the tools to be close to the machine and not mounted on separate apparatus. The entire machine tool is compact, yet all the operations are out in the open where the operator can see exactly what is going on; even though the machine tool is controlled automatically, nevertheless, there is the psychological advantage and sometimes the actual real advantage of being able to see exactly what is happening to the tools, i.e., whether they are being replaced in the propert pocket, etc. Futhermore, the tool changing operation is taking place well away from the places where the operator and other workers in the plant have access; that is to say, the operation is entirely within the periphery of the base 11. Despite the versatility of the machine in being able to perform a great number of operations with a large number of tools, nevertheless, it is capable of very accurate work because of the unique manner of supporting the spindle in massive abutments and with the force components operative on the supporting elements to give a minimum of deflection. For instance, it is interesting to note the manner in which the cartridge 19 is mounted so that heating of the spindle 21 will not cause change in the centerline of the tool.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to be secured by Letters Patent is:

1. A machine tool, comprising
  (a) a base,
  (b) a work table mounted on the base,
  (c) a column extending from the base at a location adjacent the work table,
  (d) a tool spindle mounted on the column,
  (e) a tool storage rack fixedly mounted exteriorly of the column and having a series of storage pockets,
  (f) a tool changer mounted on the top of the column and swingable about a vertical line through the column, the changer being operative to move a tool from a pocket to the tool spindle and vice versa.

2. A machine tool as recited in claim 1, wherein the tool changer includes a main body which is mounted on the column for swing motion only, a radius arm mounted on the main body for sliding motion relative thereto along a path at a right angle to the said line, a post slidably mounted at the end of the radius arm for motion parallel to the said line, and an interchange head mounted on the end of the post.

3. A machine tool as recited in claim 2, wherein the pockets are arranged in a circle of which the said line is the axis, the pockets are formed to hold the stored tools with their axes vertical, and the axis of the tool spindle is horizontal.

4. A machine tool as recited in claim 3, wherein the said post is movable vertically and wherein the interchanger head is mounted at its lower end for rotation about the axis of the post, for articulated hinge motion about a horizontal axis, and for swinging motion about a horizontal axis perpendicular to the hinge axis.

5. A machine tool as recited in claim 4, wherein the interchanger head is provided with two tool-clamping members arranged in the same plane at a right angle to each other, the plane of the tool-clamping members being horizontal when the head is located at the tool storage rack for taking or replacing a tool in a pocket, the plane being vertical when the head is located adjacent the tool spindle for removing a tool from the spindle and replacing it with another.

6. A machine tool as recited in claim 1, wherein the pockets are arranged in a circle of which the said line is an axis, a plurality of tool storage racks, all racks having a row of storage pockets arranged to hold the tools with their axes lying in a circle concentric with the said axis, the racks being arranged so that the circles are successively larger, each rack being arranged a substantial distance along the axis from the position of the next adjacent inner rack, the racks giving the appearance of a series of concentric steps arranged around the column.

7. A machine tool, comprising
  (a) a base,
  (b) a work table mounted on the base,
  (c) a column extending upwardly from the base at a location adjacent the work table, the column consisting of two parts located in spaced, parallel relationship to define a gap therebetween,
  (d) a block slidable vertically in the gap,
  (e) a cartridge slidable horizontally in the block, and
  (f) a tool spindle rotatably mounted in the cartridge with its axis in a horizontal line centrally of the said gap.

8. A machine tool as recited in claim 7, wherein the cartridge is provided with two laterally-extending horizontal wing blocks in alignment with the centerline of the spindle and a vertically-extending key block which also is aligned with the center line of the spindle, the block being provided with a longitudinally-extending cavity in which the cartridge is mounted, grooves being formed in the cavity to receive the wing and key blocks, each groove embracing its block to prevent movement laterally of the groove, but permitting in-and-out movement of the block in the groove.

9. A machine tool, comprising
  (a) a turret adapted to rotate about a vertical axis,
  (b) an arm mounted in the turret for sliding horizontal movement along a line extending through the said vertical axis,
  (c) a post mounted in one end of the arm for vertical sliding movement along a line parallel to the said vertical axis, and
  (d) an interchanger mounted on one end of the column and capable of rotative movement about a vertical axis, of swinging movement about a horizontal axis radial to the said turret axis, and of hinged movement about a horizontal axis perpendicular to a line radial to the said turret axis.

10. A machine tool as recited in claim 8, wherein the interchanger having two tool holding members mounted at 90° to one another relative to the said axis of swinging movement.

References Cited
UNITED STATES PATENTS

| | | | |
|---|---|---|---|
| 3,355,800 | 12/1967 | Daugherty | 29—568 |
| 3,263,300 | 8/1966 | Schatzmau | 29—568 |

RICHARD H. EANES, Jr., Primary Examiner